United States Patent [19]

Sumida et al.

[11] 3,965,366

[45] June 22, 1976

[54] ELECTRICAL DEVICES CONTROL SYSTEM

[75] Inventors: Shizuo Sumida; Kazuo Nii, both of Hiroshima; Osamu Shimizu, Himeji; Atsushi Ueda, Himeji; Mitsuaki Ishii, Himeji, all of Japan

[73] Assignees: Mitsubishi Denki Kabushiki Kaisha; Toyo Kogyo Co., Ltd., both of Japan

[22] Filed: Aug. 30, 1974

[21] Appl. No.: 501,985

[30] Foreign Application Priority Data

Sept. 3, 1973   Japan.............................. 48-99404

[52] U.S. Cl. ............................. 307/39; 307/10 R; 340/147 C
[51] Int. Cl.$^2$ .......................................... H02J 4/00
[58] Field of Search ..................... 307/10 R, 39, 9; 340/183, 52 F, 167 R, 413, 168 R, 147 C, 146 CN

[56] References Cited
UNITED STATES PATENTS

| | | |
|---|---|---|
| 3,333,245 | 7/1967 | Schildgen et al............... 340/147 C |
| 3,618,082 | 11/1971 | Feulner............................. 340/413 |
| 3,821,559 | 6/1974 | Ueda et al......................... 307/10 R |

Primary Examiner—Robert K. Schaefer
Assistant Examiner—M. Ginsburg
Attorney, Agent, or Firm—Oblon, Fisher, Spivak, McClelland & Maier

[57] ABSTRACT

An electrical device control system comprising: a plurality of signal sources; a plurality of electrical loads; a central operation apparatus; a plurality of terminal operation apparatus connected to the plurality of electrical loads and having means to detect the operation and a fault of the signal source and a fault of the electrical load and to generate a time division signal thereof; a multiple signal transmission line connecting the plurality of terminal operation apparatus to the central operation apparatus to transmit the time division signal to the central operation apparatus; the central operating apparatus having means to generate an activating signal for transmission over the multiple signal transmission line to the terminal station apparatus to operate an electrical load in response to the detection of the time division signal.

8 Claims, 12 Drawing Figures

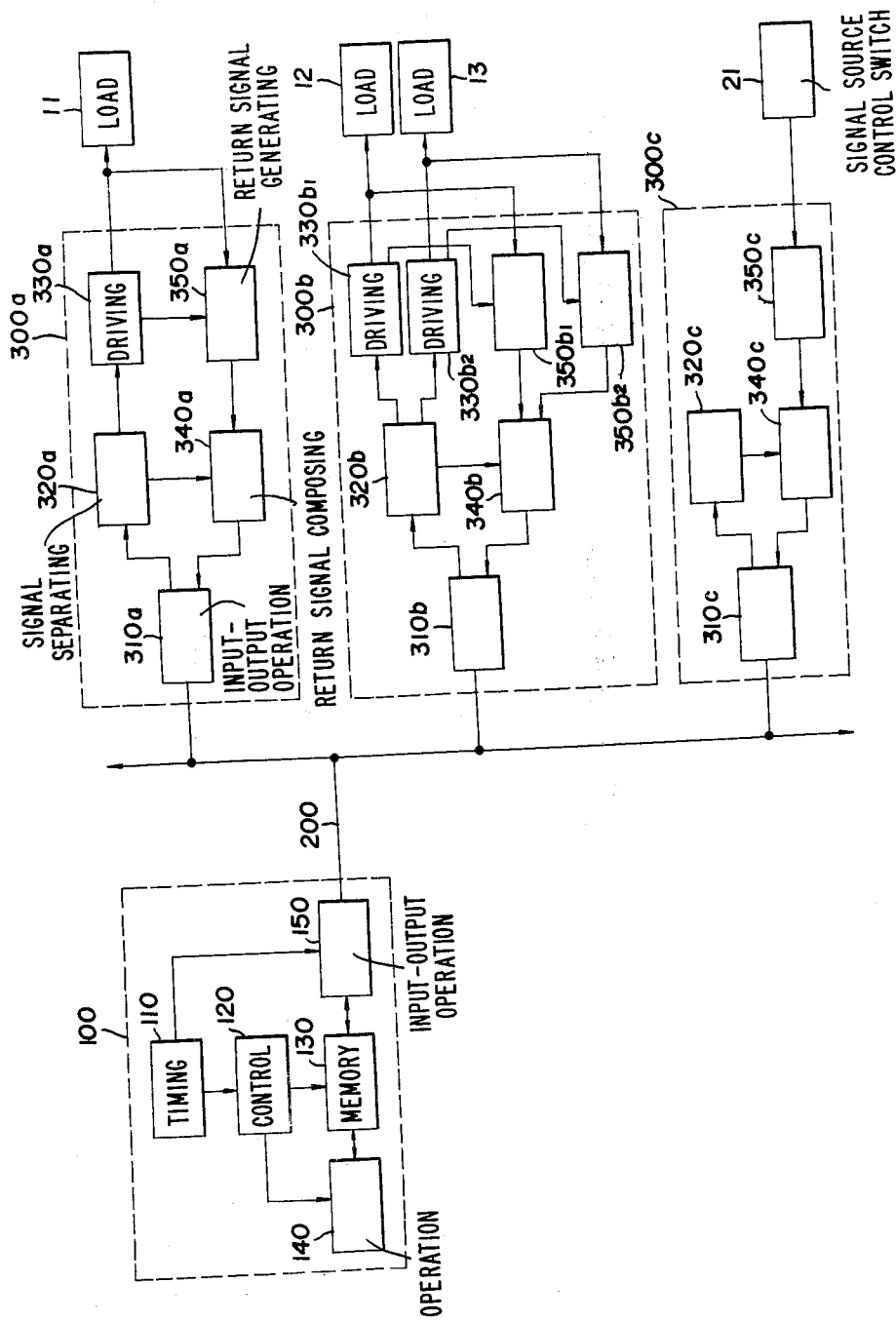

ELECTRICAL DEVICES CONTROL SYSTEM

BACKGROUND OF THE INVENTION

1. Field of the Invention:

The present invention relates to an electrical device control system for controlling a plurality of electrical devices with a time division multiple signal system.

2. Description of the Prior Art:

Heretofore, in the case of controlling a plurality of electrical loads with corresponding control switches, the electrical loads have been connected with the switches according to control considerations. FIG. 1 shows one simplified embodiment of the conventional system. In FIG. 1, the reference numeral 1 designates a power source; 2, 3, 4 designate control switches; 5, 6, 7 designate the electrical loads being controlled; 8a, 8b, 9a, 9b, 9c, 9d designate the respective electrical wirings connecting the power source 1 with the control switches 2, 3, 4 and the electrical loads 5, 6, 7 depending upon the control considerations.

The embodiment of FIG. 1 can be utilized for various sequence control devices; electrical systems of cars; call-indicating devices in a factory, valve controls of a tanker ship, etc. However, even in the simple case of FIG. 1, 6 wires have been required for the electrical wirings. In this case, the return lines from the electrical loads 5, 6, 7 to the power source 1 are to ground. If the return lines are separately formed, an additional three wires are required. As it is clear from this discussion, when the number of the electrical loads or the control switches is increased, the electrical wiring for the connections becomes complicated with the result that erroneous wirings and faults are increased. Moreover, both fault detection and maintenance have become difficult. If the control switches are changed, the connections of the electrical wirings must also be changed. If many control switches are used, the necessary rewiring is often difficult to accomplish. Moreover, when the control switches are separated from the electrical loads by a long distance, the length of the electrical wires causes additional problems.

SUMMARY OF THE INVENTION

It is therefore an object of the present invention to provide an electrical device control system which does not have the above-mentioned disadvantages. It is another object of the invention to provide an apparatus for controlling a plurality of signal sources and electrical loads using a time division multiplex system. Another object of the invention is to decrease the electrical wirings and connecting points necessary for wiring the electrical devices. A further object of the invention is to provide a control system which can easily change operation modes by centrally controlling the operation modes between the signal sources and the electrical loads. A still further object of the invention is to provide a control system for detecting faults of the electrical devices and maintaining in proper order the system. Another object of the invention is to provide a control system of increased reliability but which utilizes relatively low cost electrical components.

The foregoing and other objects are attained in accordance with one aspect of the present invention through the provision of an electrical device control system comprising: a plurality of signal sources; a plurality of electrical loads; a central operation apparatus; a plurality of terminal operation apparatus connected to the plurality of electrical loads and having means to detect the operation and a fault of the signal source and a fault of the electrical load and to generate a time division signal thereof; a multiple signal transmission line connecting the plurality of terminal operation apparatus to the central operation apparatus to transmit the time division signal to the central operation apparatus; the central operating apparatus having means to generate an activating signal for transmission over the multiple signal transmission line to the terminal station apparatus to operate an electrical load in response to the detection of the time division signal.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 2 is a block diagram showing one embodiment of the present invention;

DETAILED DESCRIPTION OF THE PREFERRED EMBODIMENTS

Figure 1:
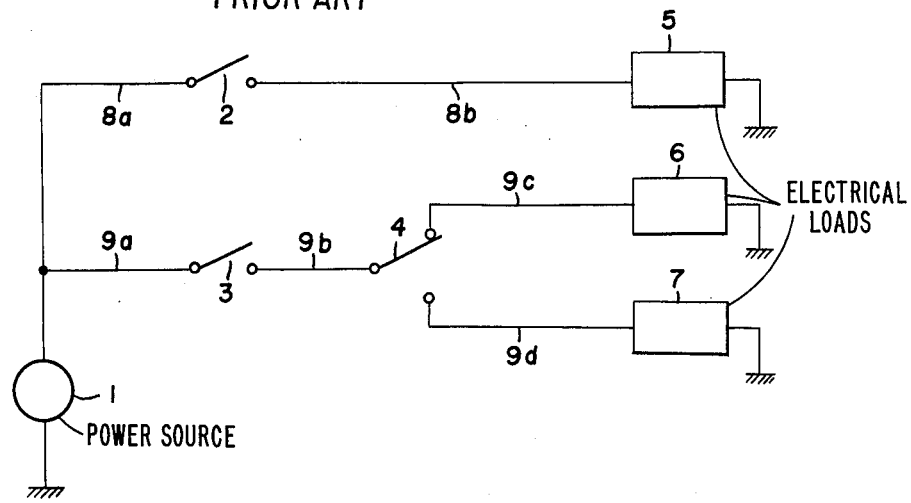
FIG. 1 is a wiring diagram of a conventional system.

Referring now to the drawings, wherein like reference numerals designate identical or corresponding parts throughout the several views, and more particularly to FIG. 2 thereof, one embodiment of the electrical device control system of the present invention will now be described. In FIG. 2, the reference numeral 100 designates a central operation apparatus which comprises a timing part 110, a control part 120, a memory part 130, an operation part 140 and an input-output operation part 150. The reference numeral 200 designates a multiple signal transmission line.

A plurality of terminal operation apparatus 300a, 300b, 300c respectively comprise input-output operation parts 310a, 310b, 310c; signal separating parts 320a, 320b, 320c; driving parts 330a, 330b$_1$, 330b$_2$; return signal composing parts 340a, 340b, 340c; and return signal generating parts 350a, 350b$_1$, 350b$_2$, 350c. The reference numerals 11, 12, 13, 21 designate electrical devices; 11, 12, 13 designate electrical loads and 21 designates a control switch. The number of the electrical devices is increased or decreased depending upon various needs.

The number of terminal operation apparatus is dependent upon the number of electrical devices. In the embodiment of FIG. 2, three terminal processing apparatus are shown.

The terminal operation apparatus 300a corresponds to one electrical load 11; the terminal operation apparatus 300b corresponds to two electrical loads 12, 13; and the terminal operation apparatus 300c corresponds to one signal source of a control switch 21. The basic structures of the terminal operation apparatus 300a, 300b, 300c are the same even though the apparatus are slightly different depending upon the type and number of the corresponding electrical devices.

The power is supplied from a power source (not shown) to the system. The operation of the embodiment of FIG. 2 will now be described. In the central operation apparatus 100, the timing part 110 generates time period command signals for the system. The reference timing signal is generated to synchronize the various parts. The input-output timing signal and the operation timing signal are also generated in the central operation apparatus. The control part 120 controls the read-in and the read-out of data to the memory part 130 and the operation of the operation part 140. The memory part 130 memorizes the data of the electrical devices 11, 12, 13, 21 which constitute information concerning the ON or OFF state of the control switch, the ON or OFF state of the electrical loads and electrical device faults.

The operation part 140 operates data of the memory part 130 in accordance with a command given by the control part 120 whereby the actuating signal of the electrical loads corresponding to a fault of the control switch or the electrical devices is generated. The result of the operation is again memorized in the memory part 130. The input-output operation part 150 transmits the actuating signal to the electrical loads as a time division multiple signal over the multiple signal transmission line 200, receives the returning signals transmitted from the terminal operation apparatus such as the actuating signal and the fault signal of the signal source 21 and the fault signal of the electrical loads 11, 12, 13 and directs the returning signals to the memory part 130.

The multiple signal transmission line 200 is commonly connected to all of the terminal operation apparatus 300a, 300b, 300c and transmits the time division multiple signal thereto. The basic structure of the terminal operation apparatus 300a, 300b, 300c are substantially the same even though minor differences appear depending upon the type and number of the electrical devices serviced. In the terminal operation apparatus 300a, the input-output operation part 310a receives the multiple signal through the multiplex signal transmission line 200 and transmits it to the signal separating part 320a. In the signal separating part 320a, the signal corresponding to the electrical load 11 is separated from the multiple signal. The driving part 330a demodulates the separated signal and amplifies it to drive the electrical load 11. The return signal generating part 350a detects the fault state of the electrical load 11. The returning signal indicating the fault state is introduced into the time division multiple signal by the composing part 340a. The time division multiple signal is transmitted through the input-output operation part 310a to the multiple signal transmission line 200 and is returned to the central operation apparatus 100.

In the terminal operation apparatus 300b, two electrical loads are connected with the result that the number of the blocks is increased as compared with the terminal operation apparatus 300a. However both of the basic structures are substantially the same. Since two loads 12, 13 are connected, the signal separating part 320b separates the signals corresponding to the two electrical loads. Two driving devices $330b_1$, $330b_2$ are required and two return signal generating parts $350b_1$, $350b_2$ are also required. The return signal composing part 340b combines the returning signals of the two electrical loads 12, 13 to form the time division multiple signal. The input-output operation part 310b is the same as the input-output operation part 310a.

Comparing the terminal operation apparatus 300a with the terminal operation apparatus 300b, the driving parts $330b_1$, $330b_2$ and the return signal generating parts $350b_1$, $350b_2$ are respectively connected to the two electrical loads 12, 13 in a manner similar to the connection of the driving part 330a to the return signal generating part 350a. The signal separation device 320b and the return signal composing part 340b are slightly different from the signal separating part 320a and the return signal composing part 340a because two signals need to be separated. However, they have substantially the same parts.

In the terminal operation apparatus 300b, the input-output operation part 310b, the signal separating part 320b and the return signal composing part 340b have substantially the same parts. Accordingly, when two electrical loads 12, 13 are treated, the structure of the terminal operation apparatus 300a can be quite simple and economical in comparison with the structure employing two terminal operation apparatus 300a. This is quite advantageous when a large number of related electrical devices are to be connected. The term related electrical devices is used to mean electrical devices near one terminal operation apparatus. If the distance is great, long wiring is required and the advantage of the system decreases.

The terminal operation apparatus 300c is connected to the signal source 21 as a related electrical device. Since the electrical device is the control switch as the signal source 21, the driving part is not required. Since the actuating signal and the fault signal of the signal source 21 is returned, the return signal generating part 350c and the return signal composing part 340c return two signals. When more than two signal sources are connected, the number of the blocks of the return signal generating part 350c is increased in a manner similar to that of the terminal operation apparatus 300b. Moreover, both the signal source and the electrical load can be connected to one terminal operation apparatus in this manner since the structure of the terminal operation apparatus for the signal source is substantially the same as that for the electrical load. This will become clear in the following detailed description of these devices.

Figure 3:
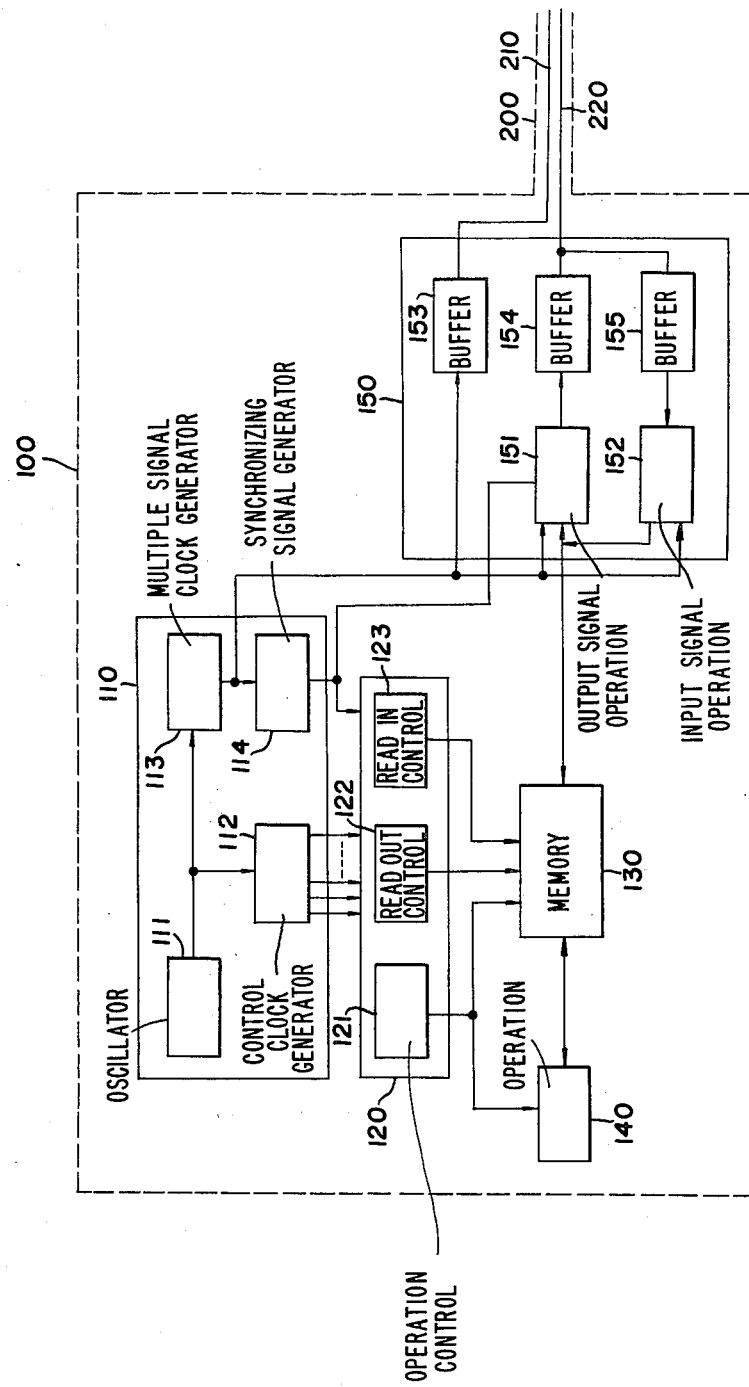
FIG. 3 is a detailed block diagram of the central operation apparatus of FIG. 2.
Figure 4:
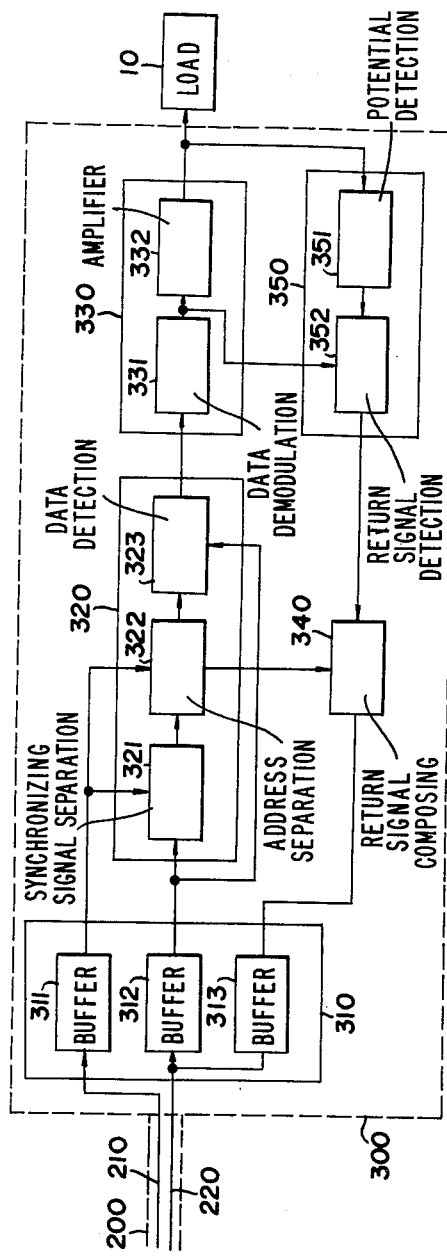
FIG. 4 is a detailed block diagram of the terminal operation apparatus of FIG. 2.

FIG. 3 is a detailed block diagram of the central operation apparatus 100. FIG. 4 is a detailed block diagram of the terminal operation apparatus 300. FIGS. 5a, b show waveforms of the multiple signals.

In FIG. 3, the reference numeral 111 designates an oscillating part, 112 designates a control clock generating part; 113 designates a multiple signal clock generating part; and 114 designates a synchronizing signal generating part. The timing part 110 consists of the four blocks 111, 112, 113, 114.

The reference numeral 121 designates an operation control part; 122 designates a read-out control part; 123 designates a read-in control part. The control part 120 consists of the three blocks 121, 122, 123.

The reference numeral 151 designates an output signal operation part; 152 designates an input signal operation part; 153, 154, 155 designate buffer circuits. The input-output operation part 150 consists of the five blocks 151, 152, 153, 154, 155.

The reference numeral 210 designates a clock signal transmission line; 220 designates a data signal transmission line. The multiple signal transmission line 200 consists of the two transmission lines 210, 220.

In FIG. 4, the reference numerals 311, 312, 313 designate buffer circuits. The input-output operation part 310 consists of the three circuits.

The reference numeral 321 designates a synchronizing signal separating part; 322 designates an address separating part; 323 designates a data detecting part. The signal separating part 320 consists of the three blocks 321, 322, 323.

The reference numeral 331 designates a data demodulating part and 332 designates an amplifying part. The driving part 330 consists of the two blocks 331, 332.

The reference numeral 351 designates a potential detecting part and 352 designates a return signal detecting part. The return signal generating part 350 consists of the two blocks 351, 352. The reference numeral 10 designates an electrical load.

FIG. 5A shows the waveform of the clock signal in the clock signal transmission line 210, wherein $t$ designates the repeating period of the clock signal and 211 designates a clock pulse.

FIG. 5B shows the waveform of the data signal in the data signal transmission line 220 wherein the reference numeral 221 designates a synchronizing signal; 222 designates an actuating signal bit; 223 designates a fault signal bit; and T designates a repeating period of the multiple signal.

Figure 5:
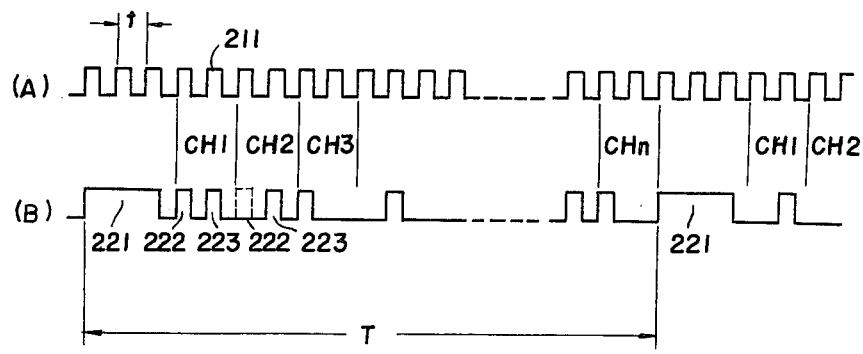
FIGS. 5A, B show waveforms of multiple signals in the apparatus of FIG. 3 and FIG. 4.

Referring to FIG. 5, the operation of the apparatus of FIGS. 3 and 4 will be described. The structure of the multiple signal will be illustrated referring to FIG. 5. The clock signal A provides the time reference of the time division multiple signal and is transmitted to the apparatus as a pulse signal with a constant repeating period. In the data signal B, the synchronizing signal 221 provides a reference time for the time measurement for the multiple signal. The data signal is repeated in a constant repeating period T.

Since the actuating signal 222 and the fault signal 223 are each equal to one pulse of the clock signal, the width of the synchronizing signal is set to more than 2 pulses of the clock pulses. In FIG. 5, the width of the synchronizing signal corresponds to 3 pulses of the clock pulse. It is possible to utilize other schemes for discriminating the other synchronizing signal such as a change of the pulse width or a change of polarity, etc.

After the synchronizing signal 221, the data of the time division multiple signal is transmitted to all of the electrical devices. In FIG. 5, the data is transmitted to the $n$ types of electrical devices, and the time periods for each electrical device are shown by the channel time periods $CH_1$, $CH_2$ ... $CH_n$. The positions of the channel time periods are designated as the addresses. The channel time periods are repeated in the repeating period T. The signal for each of the electrical devices is transmitted and received in each period T. The signal for each of the electrical devices is shown by 2 pulses of the clock signal in the channel time period.

One of the two pulses is the actuating signal pulse 222 for indicating the operation of the electrical device and the other pulse is the fault signal pulse 223 for indicating a fault of the electrical device. The central operation apparatus transmits the synchronizing signal 221, the clock signal, and the actuating signal pulse 222 for the electrical load. The terminal operation apparatus 300 returns the fault signal pulse 223 and the actuating signal pulse of the control switch. The actuating signal 222 is transmitted from the central operation apparatus 100 or is returned from the terminal operation apparatus 300. Depending upon whether the electrical device is the electrical load or the signal source, the allotment of the channel time periods to the electrical devices may be determined. Accordingly, the signals are not generated from both apparatus 100, 300.

In the central processing apparatus of FIG. 3, the oscillating part 111 is a conventional oscillating circuit for oscillating the rectangular waveform pulse at a constant frequency and can be comprised of a conventional unstable multi-vibrator such as a quartz oscillator. The multiple signal clock generating part 113 generates the multiple signal clock 221 having the period $t$ shown in FIG. 5A by frequency-dividing the pulse generated from the oscillating part, and may comprise a conventional counter circuit. The synchronizing signal generating part 114 generates the synchronizing signal 221 shown by FIG. 5B. Accordingly, the multiple signal clock 211 generated by the multiple signal clock generating part 113 is frequency-divided.

The synchronizing signal generating part 114 is formed by the counter circuit and the gate circuit. The control clock generating part 112 generates the timing signal for actuating the control part 120, the memory part 130, the operating part 140 whereby a pulse having the required frequency and pulse width in the pulse signal of the oscillating part 111 is generated. In the control part 120, the read-in control part 123 selects the desirable data from the returning signal returned from the terminal operation apparatus 300, instructs the address in the memory part 130 and memorizes the data in the memory part 130. The operation control part 121 reads out the suitable data in the memory part 130 to the operating part 140 and operates the data. The operation result is then rememorized in the predetermined address in the memory part 130 in order to generate the actuating signal for the electrical devices from the data memorized by the command of the read-in control part 123.

The read-out control part 122 reads out the operated result from the memory part 130 in order to actuate the electrical devices. The operation control part 121, the read-out control part 122 and the read-in control part 123 can be formed by a conventional Read Only Memory (hereinafter referred to as ROM). The memory part 130 stores read-in and read-out desirable data at a desirable period and can be formed by the conventional Read Write Memory which is usually referred as Random Access Memory; (hereinafter referred to as RAM). The operating part 140 can be formed by conventional logical operation circuits.

In the input-output operation part 150, the output signal operation part 151 converts the data read out from the memory part 130 by the command of the read-out control part 122 in accordance with the multiple signal pulse thereby providing the actuating signal 222 with a desirable timing and a desirable pulse width. The input signal operation part 152 reads out the return signal given by the terminal operation apparatus 300 from the signal in the multiple signal transmission line 200 under suitable timing. The output signal operation part 151 and the input signal operation part 152 are the interface for setting the timing of the data operation in the central operation apparatus 100 and the multiple signal in the multiple signal transmission line 200. The output signal operation part 151 and the input signal operation part 152 can be formed by a combination of gate circuits.

The buffer circuits 153, 154 convert potential levels so as to decrease the effect of outer noise upon the clock signal and the data signal and so as to protect the central operation apparatus 100 from the outer surge transmitted through the transmission line 200. The buffer circuit 155 converts the signal on the transmission line 200 to the level applicable for the central operation apparatus 100 and prevents the transmission of the outer surge. The buffer circuits 153, 154, 155 can be formed by conventional transistor, resistor and capacitor circuits.

In the terminal operation apparatus 300 of FIG. 4, the buffer circuits 311, 312 convert the signal on the multiple signal transmission line 200 to the level applicable for the terminal operation apparatus 300 and prevent the transmission of the outer surge. The buffer circuit 313 converts the signal given by the terminal operation apparatus 300 which is then transmitted through the multiple signal transmission line 200. In the signal separating part 320, the synchronizing signal separating part 321 detects and separates the synchronizing signal 221 and the data signal whereby the reference time of the multiple signal can be detected. The synchronizing signal separating part 321 separates the synchronizing signal 221 by counting the clock pulse 221 since the synchronizing signal has a pulse width of more than two pulses of the clock pulse 221. The synchronizing signal separating part 321 can be formed by a counter circuit.

The address separating part 322 detects the channel time period of the electrical load 10 corresponding to the terminal operation apparatus 300 whereby the timing for the actuating signal 222 and the timing for the fault signal 223 are generated. The address separating part 322 can comprise a counter-decoder circuit. The counter circuit is reset by the synchronizing signal 221 which is detected by the synchronizing signal separating part 321 whereby the clock pulse 211 is counted.

The decoder circuit decodes the output of the counter circuit. The output is generated when it reaches a predetermined value. The set of the decoder is determined by the channel number alloted to the electrical load. In the case of $CH_1$, the decoder is set to give the first and second pulses as the output of the decoder after the synchronizing signal 221. In the case of $CH_2$, the decoder is set to give the third and fourth pulses as the output of the decoder after the synchronizing signal.

The data detecting part 323 detects the actuating signal 222 which is separated by the address separating part 322 whereby it is possible to separate the signal for the electrical load 10 transmitted from the central processing apparatus 100. The data detecting part 323 can be formed by a gate circuit.

In the driving part 330, it is necessary for the data demodulating part 331 to maintain the actuating signal during the repeating period T of the multiple signal, since the actuating signal 222 separated by the data detecting part 323 is the pulse signal. The data demodulating part 331 can be formed by a flip-flop circuit or an integrated circuit. The amplifying part 332 amplifies the output of the demodulating part 331 to the level required for driving the electrical load 10. The amplification part can be formed by a transistor amplifying circuit.

In the return signal generating part 350, the potential detecting part 351 detects the potential between the electrical load 10 and ground which is the output voltage of the amplifying part 332. The fault of the electrical load 10 can be detected by comparing the output of the potential detecting part 351 with the data for the electrical load 10 in the data demodulating part 331.

The detection of the fault will be described referring to FIG. 6. In the return signal composing part 340, the fault signal detected by the return signal detecting part 352 is returned as the fault signal 223 during the channel time period separated by the address separating part 322 in order to transmit the fault signal through the data signal transmission line 220 during the desirable time period. The return signal composing part 340 can be formed by a gate circuit. The fault signal 223 given from the return signal composing part 340 is transmitted through the buffer circuit 313 to the data signal transmission line.

In the embodiment of the terminal operation apparatus 300, only one electrical load 10 is given as the corresponding electrical device. However, it is possible to operate two electrical loads by increasing the blocks. That is, the two channel time periods are separated by the address separating part 322 and the two decoder circuits are accordingly set. The data detecting part 323, the data demodulating part 331 and the amplifying part 332 correspond to each electrical load. The return signal generating part 350 also corresponds to each electrical load. The return signal composing part 340 composes the returning signals of the two electrical loads. As stated above, even though two electrical loads are connected, more than half of the structure of the terminal operation apparatus 300 can be commonly used. Accordingly, the structure is more advantageous than two terminal operation apparatus 300. In the case of more than two electrical loads, similar considerations can be applied. When the corresponding electrical device is a control switch, the driving part 330 is not required as stated with reference to FIG. 2. The data detecting part 323 is also not required. In the return signal generating part 350, the operation and the fault of the signal source can be detected by detecting the potential of the signal source of the switch.

Figure 7:
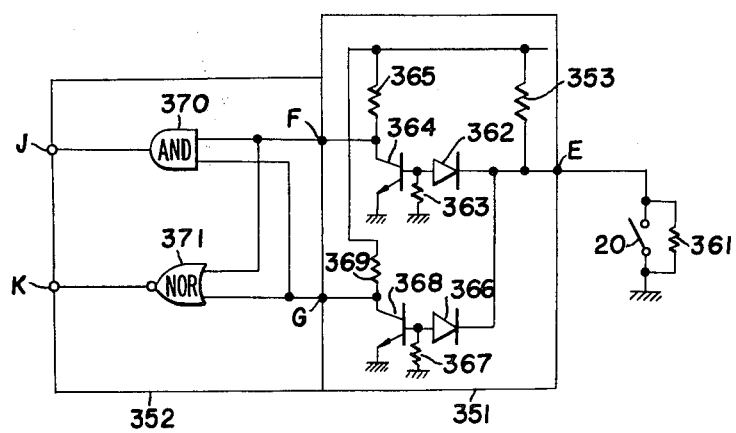
FIG. 7 is a circuit diagram showing one embodiment of the return signal generating part of FIG. 2 with a control switch.

The embodiment will be illustrated referring to FIG. 7. In the return signal composing part 340, the signal of the operation and the fault of the control switch are returned as the multiple signal in the channel time period separated by the address separating part 322. When the corresponding electrical device is the control switch, one part of the structure of the terminal operation apparatus is modified or deleted in comparison with the case of the electrical load. Moreover, when more than two control switches are connected, they can be operated by only a single terminal operation apparatus as illustrated in the case of the electrical loads. When the signal source of the control switch and the electrical load are combined, the structure of the terminal operation apparatus is not substantially changed with the result that they can be operated by only a single terminal operation apparatus.

Figure 6:
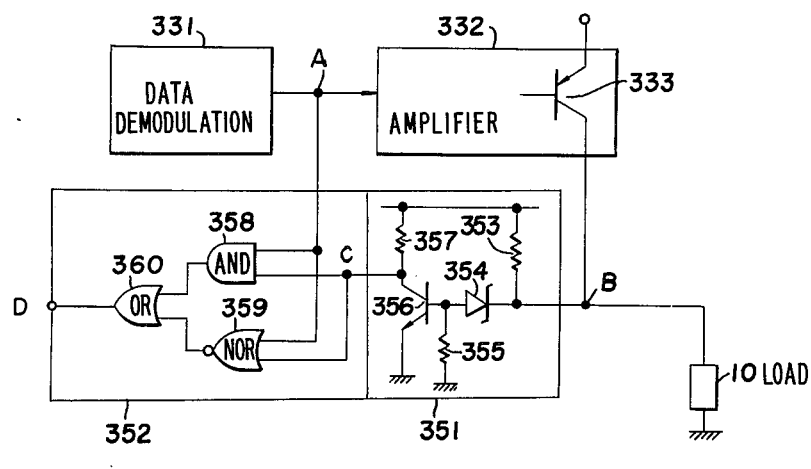
FIG. 6 is a circuit diagram showing one embodiment of the return signal generating part of FIGS. 2 and 4 with an electrical load.

Referring to FIGS. 6 and 7, the embodiment of the return signal generating part 350 will be illustrated. In FIG. 6, the electrical device is the electrical load and in FIG. 7, the electrical device is the signal source of the control switch. In FIG. 6, the reference numeral 333 designates a transistor; 353, 355, 357 designate resistors; 354 designates a constant voltage diode; 356 designates a transistor; 358 designates an AND gate; 359 designates a NOR gate; and 360 designates an OR gate. The output of the data demodulating part 331 appears at A. The amplifying part 332 is connected to the electrical load at B. The output of the return signal detecting part 352 appears at D.

In the description, H level or H designates power voltage level and L level or L designates ground voltage level. The operation of the embodiment of FIG. 6 will now be described. When A is at H level, transistor 333 is in the ON state whereby electrical load 10 is driven. The resistance of resistor 353 is much higher than the resistance of electrical load 10 whereby a small current always passes to electrical load 10. The constant voltage diode 354, the transistor 356 and the resistors 355, 357 form a potential level detecting apparatus. The detected potential level is dependent upon the constant voltage diode 354. The detected level $V_1$ is about one-half of the power voltage.

When A is at L level and the electrical load 10 is in the OFF state and the electrical load 10 is in the normal state, B is at L level; C is at H level; D is at L level whereby the no fault state is indicated. When A is at H level and the electrical load 10 is in the ON state and the electrical load 10 is in the normal state, B is at H level; C is at L level; D is at L level whereby the no fault state is indicated. On the contrary, when the electrical load 10 is grounded, B is at L level, C is at H level, the output of AND gate 358 is at H level and D is at H level whereby a fault state is indicated. As stated above, the fault of the break or grounding of the electrical load 10 is clear when the output of the return signal detecting part 352 is at H level.

In FIG. 7, the reference numeral 20 designates a signal source of the control switch; 361 designates a resistor; 353, 363, 367, 369 designate resistors; 362, 366 designate constant voltage diodes; 364, 368 designate transistors; 370 designates an AND gate; and 371 designates a NOR gate. The signal source 20 is connected to the potential detecting part 351 at E. The output of the potential detecting part appears at F, G. The output of the return signal detecting part 352 appears at J, K. The resistance of the resistor 353 is set to be substantially equal to that of the resistor 361 whereby the potential $V_1$ at E is about one-half of the power voltage in the OFF state of the signal source 20. The constant voltage diode 362, the transistor 364, the resistors 363, 365 form a first potential detecting circuit having the structure as stated in FIG. 6. The detecting level $V_2$ is set so that $V_1$ is less than $V_2$. The constant voltage diode 366, the transistor 368, the resistors 367, 369 form a second potential detecting circuit. The detecting level $V_3$ is set so that $V_3$ is less than $V_1$.

Since the potential at E is $V_1$ in the OFF state of the signal source 20, F is at H level, G is at L level and J, K are respectively at L level whereby the OFF state of the signal source 20 indicates no fault. When the wiring to the signal source 20 is disconnected, E is at H level; F, G, are respectively at L level; K is at L level whereby the fault is indicated. When the signal source 20 is in the ON state. E is at L level; F, G are respectively at H level; J is at H level whereby the ON state of the signal source 20 is indicated.

As stated above, the output at J indicates the actuating signal of the signal source 20. The ON state of the signal source 20 is indicated by the H level at J. The OFF state of the signal source 20 is indicated by the L level at J. The fault signal of the signal source 20 appears at K whereby the fault of the signal source 20 is indicated by the H level at K and no fault of the signal source 20 is indicated by the L level at K. As stated above, it is possible to detect the fault state of the electrical load and the operation and the fault of the signal source 20.

Comparing FIG. 6 and FIG. 7, two potential detecting circuits are required in FIG. 7 and one OR gate 360 of the return signal detecting part 352 is required in FIG. 6. Accordingly, when the detecting potential level of the potential detecting circuit in FIG. 6 is set so as to be equal to the detecting potential level $V_2$ of the first potential detecting circuit, the two potential detecting circuits can be commonly used. When the contact A in FIG. 6 is changed to the contact G in FIG. 7 and the outputs of the AND gate 358 and the NOR gate 359 are direct outputs, the contacts J, K are indicated. As stated above, the return signal generating part 350 can have the same structure whether the electrical device is the electrical load 10 or is the signal source 20. The signal can be transmitted in the same manner, even when the electrical device is an analogue signal source. The analogue signal can be converted to the digital signal by a conventional A-D converter.

Figure 8:
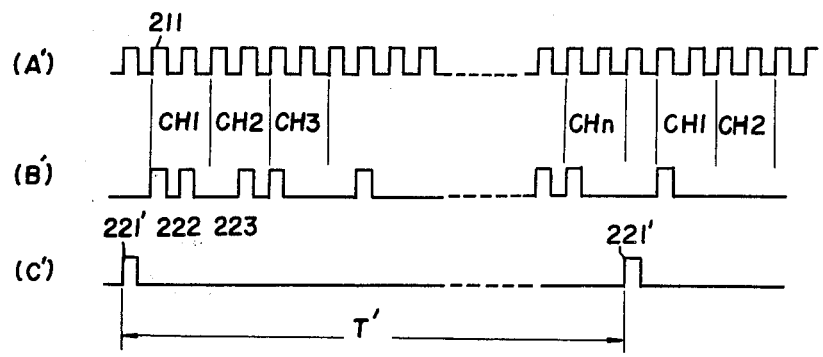
FIGS. 8A', B', C' show waveforms of multiple signals in another signal transmission system.
Figure 9:
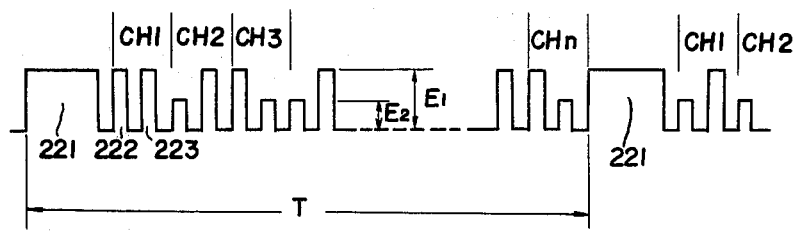
FIG. 9 shows a waveform of a multiple signal in another signal transmission system.

The digital signal can be considered the same as the ON, OFF operation of the control switch 20. Accordingly, it is possible that the digital signal can be returned as the actuating signal when the digital signal is given as the input of the potential detecting part 351. In this embodiment, the multiple signal transmission line 200 is formed by two wires of the clock signal transmission line 210 and the data signal transmission line 220. It is also possible to transmit the synchronizing signal 221 separately by adding another signal transmission wire. In this case, as shown in FIG. 8, the synchronizing signal 221 is transmitted for one pulse of the clock pulse in the synchronizing signal transmission line of FIG. 8C whereby the waveform of the data signal shown in FIG. 5B is only the actuating signal 223 which has the waveform shown in FIG. 8B'. Since the pulse width of the synchronizing signal 221 can be small, the repeating period T' is slightly shorter than the repeating period T. This increases the quantity of data operated in the same period. The synchronizing signal separating part 321 can be deleted from the terminal operation apparatus 300. However, in the input-output operation parts 150, 310, it is necessary to set the buffer circuit for the synchronizing signal transmission line. On the other hand, it is possible to transmit all of the signals by one wire. The wavefore in this case is shown in FIG. 9 wherein the data signal is transmitted with the amplitude $E_1$ and the clock signal is transmitted with the amplitude $E_2$ which is about one-half of $E_1$. In accordance with this embodiment, it is possible to separate the clock signal and the data signal by providing a composing circuit wherein the amplitude of the clock signal is one-half of the amplitude of the data signal in the output operation of the transmitting side and by detecting the level in the input operation of the receiving side. The composing circuit can be formed by the OR circuits for the data signal having the amplitude $E_1$ and for the clock signal having the amplitude $E_2$. The separating circuit in the receiving side can be formed by the potential level detecting part comprised of the constant voltage diode.

The number of the wires for the multiple signal transmission line 200 can be selected depending upon the structure of the input-output operation parts 150, 310. As stated above, in accordance with the invention, the actuating signal and the fault signal of the signal source such as the control switch or the analogue signal source and the fault signal of the electrical load are returned as a time division multiple signal from the terminal operation apparatus 300 to the central operation apparatus 100. In the central operation apparatus 100, the logical operation is carried out by the inner control function whereby the actuating signal corresponding to the electrical load is generated. The actuating signal is transmitted as the time division multiple signal to the terminal operation apparatus 300 where the actuating signal is detected and the corresponding electrical load is operated. Accordingly, the number of wires necessary for wiring the electrical devices can be decreased and the number of the contacts can be decreased.

Even when the operation mode between the electrical devices is changed, it is a relatively simple matter to modify it by changing the system of the operation control part 121. The operation state and the fault state of the electrical devices can be detected by the central operation apparatus 100 when the device indicating the fault of the electrical devices is equipped to actuate the command of the central operation apparatus 100. When a fault of the electrical device occurs the fault position and the fault state are indicated immediately whereby corrective action is easily taken. When a back-up electrical device is provided, the back-up electrical device can be actuated whereby the reliability of the operation can be improved.

The central operation apparatus 100 may comprise known electronic parts and no mechanical part is required with the result that reliability is improved. Moreover, all terminal operation apparatus 300 can be of the same structure so that a special integrated circuit can be utilized yielding lower costs and improved reliability.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An electrical device for controlling and monitoring loads comprising:
   a central operation apparatus comprising:
   a timing part,
   a control part,
   an operating part,
   a memory part,
   an input-output operating part,
   means connecting the timing part to the control part and to the input-output operating part,
   means connecting the control part to the operating part and to the memory part,
   means connecting the operating part and the memory part,
   means connecting the memory part and the input-output operating part,
   means connecting the input-output operating part and a multiple signal transmission line,
   a first electrical load,
   a first terminal operation apparatus comprising:
   an input-output operating part,
   a signal separating part,
   a return signal composing part,
   a driving part,
   a return signal generating part,
   means connecting the multiple signal transmission line and the input-output operating part,
   means connecting the input-output operating part to the signal separating part,
   means connecting the signal separating part to the driving part,
   means connecting the signal separating part to the return signal composing part,
   means connecting the driving part to the first electrical load,
   means connecting the driving part to the return signal generating part,
   means connecting the first electrical load to the return signal generating part,
   means connecting the return signal generating part to the return signal composing part,
   means connecting the return signal composing part to the input-output operating part,
   a signal source control switch,
   a second terminal operation apparatus comprising:
   an input-output operating part,
   a signal separating part,
   a return signal composing part,
   a return signal generating part,
   means connecting the multiple signal transmission line and the input-output operating part,
   means connecting the input-output operating part to the signal separating part,
   means connecting the signal separating part to the return signal composing part,
   means connecting the signal source control switch to the return signal generating part,
   means connecting the return signal generating part to the return signal composing part,
   means connecting the return signal composing part to the input-output operating part.

2. An electrical device for controlling and monitoring loads in accordance with claim 1 wherein a combination including the timing part comprises:
   an oscillating part,
   a control clock generating part,
   a multiple signal clock generating part,
   a synchronizing signal generating part,
   means connecting the oscillating part to the control clock generating part and to the multiple signal clock generating part,
   means connecting the multiple signal clock generating part to the synchronizing signal generating part and to the input-output operating part,
   means connecting the synchronizing signal generating part to the control part and to the input-output operating part,
   means connecting the control clock generating part to the control part.

3. An electrical device for controlling and monitoring loads in accordance with claim 2 wherein the combination including the control part comprises:
   an operating control part,
   a read-out control part,
   a read-in control part, means connecting the operating control part to the operating part and to the memory part, means connecting the read-out control part to the memory part, means connecting the read-in control part to the memory part.

4. An electrical device for controlling and monitoring loads in accordance with claim 3 wherein the combination including the input-output operating part comprises:

an output signal operating part, an input signal operating part, a first buffer part, a second buffer part, a third buffer part, the multiple signal transmission line comprising a clock signal transmission line and a data signal transmission line, means connecting the multiple signal clock generating part to the first buffer part, to the output signal operating part and to the input signal operating part, means connecting the synchronizing signal generating part to the output signal operating part, means connecting the memory part and the output signal operating part, means connecting the output signal operating part to the second buffer part, means connecting the third buffer part to the input signal operating part, means connecting the first buffer part and the clock signal transmission line, means connecting the second buffer part and the data signal transmission line, means connecting the third buffer part and the data signal transmission line.

5. An electrical device for controlling and monitoring loads in accordance with claim 1 wherein a combination including the input-output operating part of the terminal apparatus comprises:

a first buffer part, a second buffer part, a third buffer part, the multiple signal transmission line comprising a clock signal transmission line and a data signal transmission line, means connecting the clock signal transmission line and the first buffer part, means connecting the data signal transmission line and the second buffer part, means connecting the data signal transmission line and the third buffer part, means connecting the first buffer part to the signal separating part, means connecting the second buffer part to the signal separating part, means connecting the third buffer part to the return signal composing part.

6. An electrical device for controlling and monitoring loads in accordance with claim 5 wherein the combination including the signal separating part comprises:

a synchronizing signal separating part, an address separating part, a data detecting part, means connecting the first buffer part to the synchronizing signal separating part and to the address separating part, means connecting the second buffer part to the synchronizing signal separating part and to the data detecting part, means connecting the synchronizing signal separating part to the address separating part, means connecting the address separating part to the return signal composing part, means connecting the address separating part to the data detecting part, means connecting the data detecting part to the driving part.

7. An electrical device for controlling and monitoring loads in accordance with claim 6 wherein the combination including the driving part comprises:

a data demodulating part, an amplifying part, means connecting the data detecting part to the data demodulating part, means connecting the data demodulating part to the amplifying part and to the return signal generating part, means connecting the amplifying part to the electrical load.

8. An electrical device for controlling and monitoring loads in accordance with claim 7 wherein the combination including the return signal generating part comprises:

a return signal detecting part, a potential detecting part, means connecting the electrical load to the potential detecting part, means connecting the potential detecting part to the return signal detecting part, means connecting the return signal detecting part to the return signal composing part, means connecting the data demodulating part to the return signal detecting part.

* * * * *